(12) United States Patent
Aida et al.

(10) Patent No.: US 6,333,848 B1
(45) Date of Patent: Dec. 25, 2001

(54) STORAGE DEVICE WITH VIBRATION REDUCTION UNIT

(75) Inventors: Yasuhiko Aida; Yuuji Maeda, both of Kanagawa-ken; Hiroshi Niwa; Akimitsu Omori, both of Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/392,644

(22) Filed: Sep. 9, 1999

(30) Foreign Application Priority Data

Sep. 21, 1998 (JP) .................................................. 10-266657

(51) Int. Cl.$^7$ ...................................................... G06F 1/16
(52) U.S. Cl. .......................... 361/685; 361/683; 361/684; 361/686; 188/267; 188/378; 335/285; 335/306
(58) Field of Search .................................. 361/683–686; 188/378, 267; 335/285, 306

(56) References Cited

U.S. PATENT DOCUMENTS 5,445,249 * 8/1995 Aida et al. ............................ 188/378
5,463,527 * 10/1995 Hager et al. ........................... 361/685
5,896,961 * 4/1999 Aida et al. ............................ 188/378

FOREIGN PATENT DOCUMENTS 06-150619    5/1994  (JP) .
10-339354   12/1998  (JP) .

* cited by examiner

*Primary Examiner*—Leo P. Picard
*Assistant Examiner*—Yean-Hsi Chang
(74) *Attorney, Agent, or Firm*—Foley & Lardner

(57) ABSTRACT

The storage device reduces vibration accompanied by high-speed rotation of a storage media, and raises reliability as well. In a stationary position of amass object, each magnetic pole of the movable portion magnet is disposed so that their position is provided in opposite relation to each magnetic pole of a fixed portion magnet, and each magnetic pole of a movable portion magnet and the fixed portion magnet is opposite a different magnetic pole with respect to each other. An attraction force:F1 and a repulsion force:F2 between facing (or confronting) magnetic pole can be used efficiently, and a large vibration energy or inertia force can be obtained by a small-sized magnet.

1 Claim, 9 Drawing Sheets

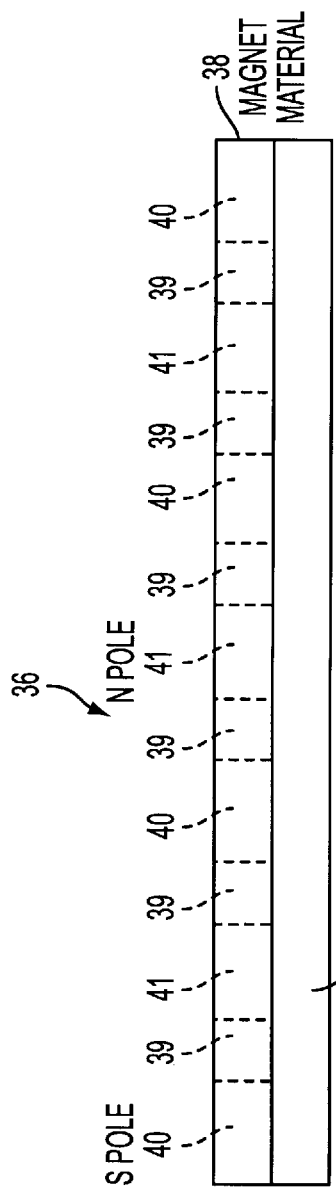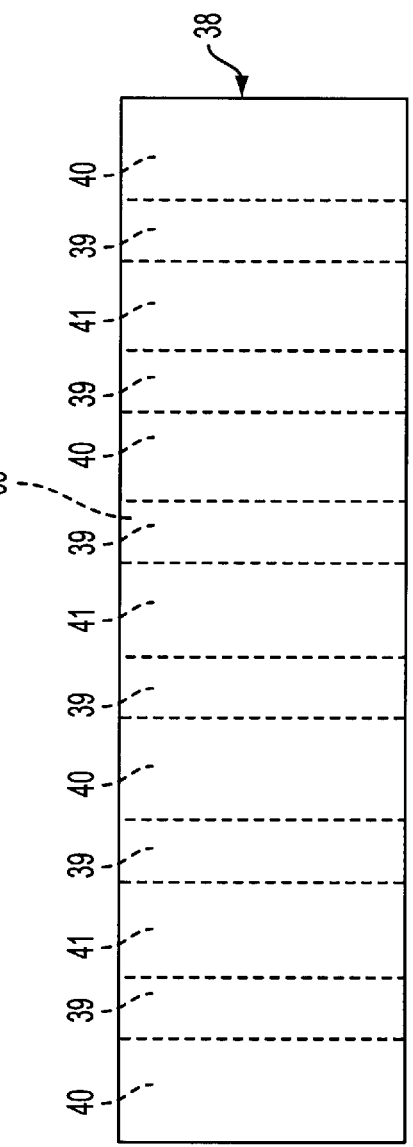

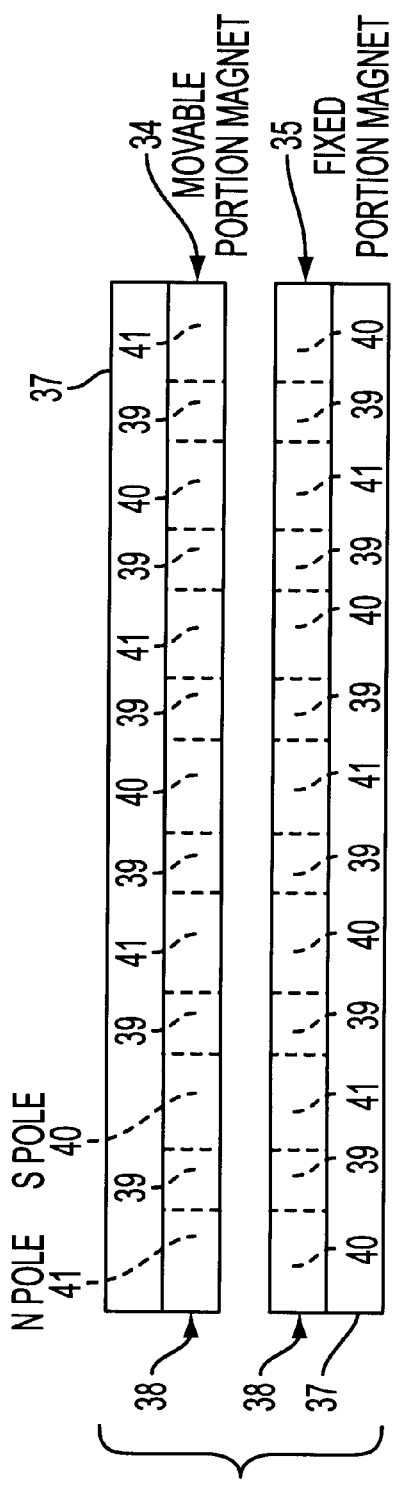
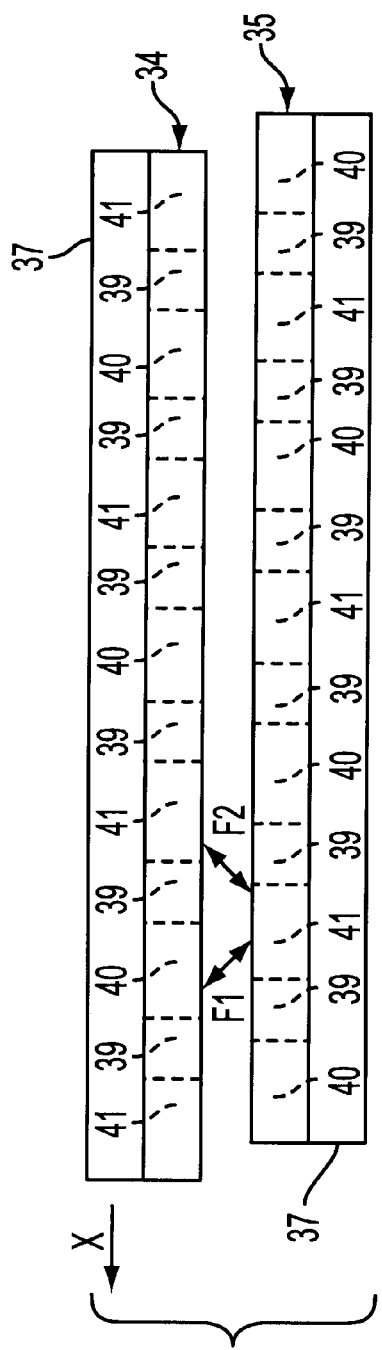
FIG. 4A
FIG. 4B

STORAGE DEVICE WITH VIBRATION REDUCTION UNIT

FIELD OF THE INVENTION

The present invention relates to a storage device applied to equipment such as a computer, for example. That is, the present invention relates to a storage device which can reduce and suppress vibrations generated by operating a storage media in the storage device.

DESCRIPTION OF THE RELATED ART

Generally, an external storage device for an information memory is used in equipment such as a computer that has a structure to drive a disk storage media, such as a magnetic disk storage device, or a magneto-optical disc storage. In the above-mentioned storage device, a replacement of a whole storage device is necessary when the storage device is too old for reliable use or based on a storage-capacity shortage, or when it does not work correctly.

It is desirable that this replacement process be done in a quick and easy manner. Referring to FIG. 7 to FIG. 9, an outline of a conventional storage device will be explained.

FIG. 7 is a top view showing a structure of a storage device. As shown in FIG. 7, for the storage device 1, a disk storage media 3 is contained in a fixed frame 2 that has a rectangular form. The fixed frame 2 can also have a square form.

The storage media 3 is mounted for rotational movement in the fixed frame 2. A storage device connector portion 4 that provides an electrical connection is formed on one side of the fixed frame 2. A guide portion 5 is formed on opposite sides of the fixed frame 2 which adjoin the side which adjoins the storage device connector portion 4, and is used to guide the fixed frame 2 in place. Also, insertion and removal of the storage device 1 with respect to the electric equipment (such as a computer, not shown) is performed by the guide portion 5.

FIG. 8 is a top view showing an attachment state to electric equipment of the storage device 1. As shown in FIG. 8, the electric equipment or a rectangular-shaped storage device mounting portion 6 prepared in a cabinet only for the storage device 1 (not shown) is arranged along a perimeter of the storage device 1. The electric equipment connector portion 7 is installed inside of the storage device mounting portion 6. A side of the storage device mounting portion 6 adjoins the electric equipment connector portion 7. A guide rail 8 is installed on the sides which adjoin the electric equipment connector portion 7, with those sides being opposite positioned with respect to each other. The guide portion 5 in the storage device 1 is guided and inserted along the guide rail 8.

Moreover, the storage device connector portion 4 of the storage device 1 and the electric equipment connector portion 7 of the storage device mounting portion 6 are connected together. Thus, the storage device 1 is installed in the storage device mounting portion 6. Furthermore, the fixed frame 2 and the storage device mounting portion 6 are connected through supporting plates 9. Screws 10 are used to affix the storage device mounting portion 6 to the storage device 1.

FIG. 9 is a top view showing an attachment state to an electric equipment of a storage device 1. FIG. 9 has almost the same structure as FIG. 8, with a difference being the attaching of rubber isolator 11 between a fixed frame 2 and a storage device mounting portion 6. That is, the difference between FIG. 8 and FIG. 9 is the fixing of the storage device 1 in the storage device mounting portion 6 through the rubber isolator 11 as opposed to the use of screws 10.

A storage media 3 rotates in the storage device 1 at a fixed revolution. Moreover, a "read-out and write-in" head of the storage device 1 (not shown) moves on the storage media 3, and, by performing this action, "informational read-out and write" in any position on the storage media 3 can be performed.

In recent years, in the storage device 1, to increase rotational speed related to "read-out and write", there has been a tendency to form a storage media 3 which can operate at a higher rotational speed. However, as the storage media 3 is formed into a high rotation speed operation, vibration generated in the storage device 1 will also increase. Therefore, there exists problem a in that there is a possibility of lowering the reliability of the "read-out and write-in" function of information on the storage device 1.

One conventional approach shown in FIG. 8 as a vibration control of the storage device 1, in which the fixed frame 2 and the storage device mounting portion 6 are connected together with supporting plates 9 and fixed screws 10. Another conventional approach to mitigate vibrations is by attaching the rubber isolators 11 between the fixed frame 2 and the storage device mounting portion 6, as shown in FIG. 9.

However, for example, when the storage device 1 needs to perform "exchange and maintenance" during operation, there occurs some problems described below, in particular, the storage device for a computer in continuous-running plants. That is, when an exchange (or replacement) process is performed, removal of the fixed screws 10 or the rubber isolators 11 are needed, and the exchange process becomes complicated and time-consuming.

On the one hand, "a design and a manufacture" of parts for vibration reduction are needed when a high-speed rotation type storage device is applied to an existing electric device which has not taken into consideration a vibration reduction of the storage device 1. Moreover, in the cabinet of an electric device which uses a majority of the storage device 1, a problem exists in the vibration control will become large-scale, and will become difficult to resolve.

SUMMARY OF THE INVENTION

It is an object of the invention to provide a storage device which overcomes the disadvantages of the conventional approaches described above.

It is a further object of the present invention to provide a storage device which can reduce and suppress vibrations accompanied by high-speed revolution of a storage media, and enhance reliability, and enable the storage device to be easily detachable from and attachable to equipment.

There has been provided according to one aspect of the present invention, a storage device which comprises a connector unit for transferring information between a storage media mounted in the storage device and an electric equipment which is operated based on said information, a frame for holding said storage media and a vibration reduction unit for absorbing a vibration energy or inertia force which occurs when the storage media is operated, the vibration reduction unit provided inside of the frame.

There has been provided according to another aspect of the present invention, a storage device which comprises a connector unit for transferring information between a storage media mounted in the storage device and an electric equipment which is operated based on the information, a frame for holding the storage media and a vibration reduction unit for absorbing a vibration energy or inertia force which occurs when the storage media is operated, and the vibration reduction unit comprises: a mass object which is adapted to be relatively movable transfer to the frame on a plane which intersects perpendicularly with a rotating spindle of the storage media; and a vibration control unit adapted to absorb a vibration energy or inertia force occurring in the frame when the storage media is operated by a vibration energy or inertia force given between the mass object and the frame.

BRIEF DESCRIPTION OF THE DRAWINGS

A more complete appreciation of the invention and many of the attendant advantages thereof will be readily obtained and better understood by reference to the following detailed description when considered in connection with the accompanying drawings.

FIG. 3(a) is a side view showing a side of a permanent magnet with a plurality of magnetic poles applied as a movable portion magnet or a fixed magnet.

FIG. 3(b) is a top view showing of a permanent magnet with a plurality of magnetic poles.

FIG. 4(a) is a side view showing a stationary state of a movable portion magnet and a fixed portion magnet.

FIG. 4(b) is a side view showing a displacement state of a movable portion magnet dislocated from the stationary state portion.

DETAILED DESCRIPTION OF THE PREFERRED EMBODIMENTS

The present invention may be embodied in other specific forms without departing from the spirit or essential attributes therefore and, accordingly, reference should be made to the appended claims, rather than to the forgoing specification, as indicating the scope of the invention.

An embodiment of a storage device according to this invention is explained with reference to FIG. 1 to FIG. 6.

In a first embodiment (FIG. 1 to FIG. 4), a storage device which forms a storage media retention equipment in an exterior of a fixed frame is provided.

Figure 1:
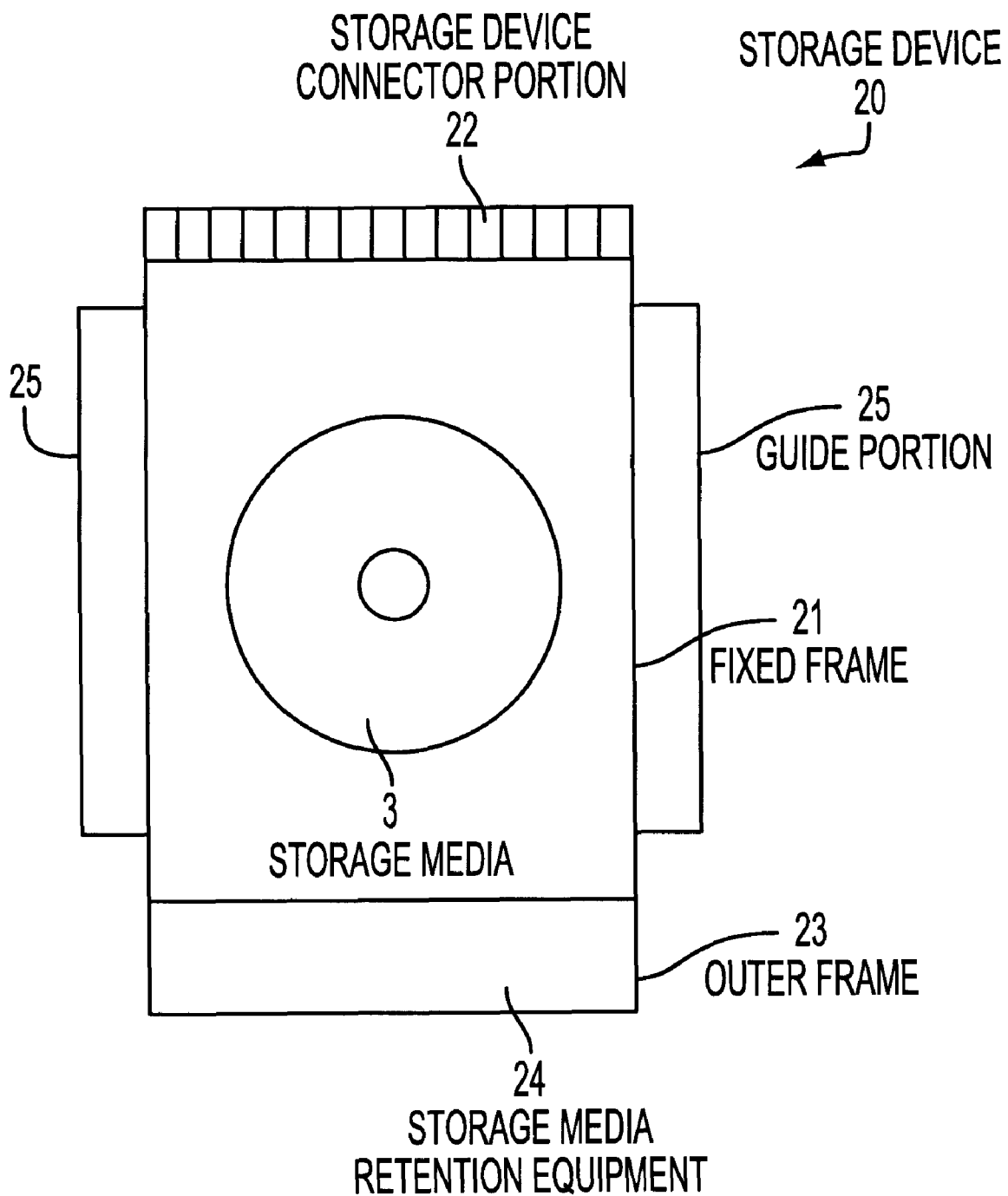
FIG. 1 is a top view showing of a storage device that includes an outside storage media retention equipment of a first embodiment according to the invention.

FIG. 1 is a top view showing a structure of the storage device which forms a storage media retention equipment 24 in an exterior of a fixed frame 21 of a storage device 20. As shown in FIG. 1, the storage device 20 contains a disk shaped storage media 3 in a rectangular-shaped fixed frame 21.

The storage media 3 is mounted in the fixed frame 21 and rotates in the fixed frame 21. A storage device connector portion 22 for making an electrical connection is formed on one side of the fixed frame 21. A storage media retention equipment 24 contained in an outer frame 23 is connected to a side which is opposite with respect to the storage device connector portion 22.

Moreover, a guide portion 25 is provided on the sides which adjoin the storage device connector portion 22, and the guide portion 25 is provided so that the fixed frame 21 can be properly installed. The guide portion 25 is used for smoothly performing attachment and removal of the storage device 20 to the electric equipment (not shown).

Figure 2:
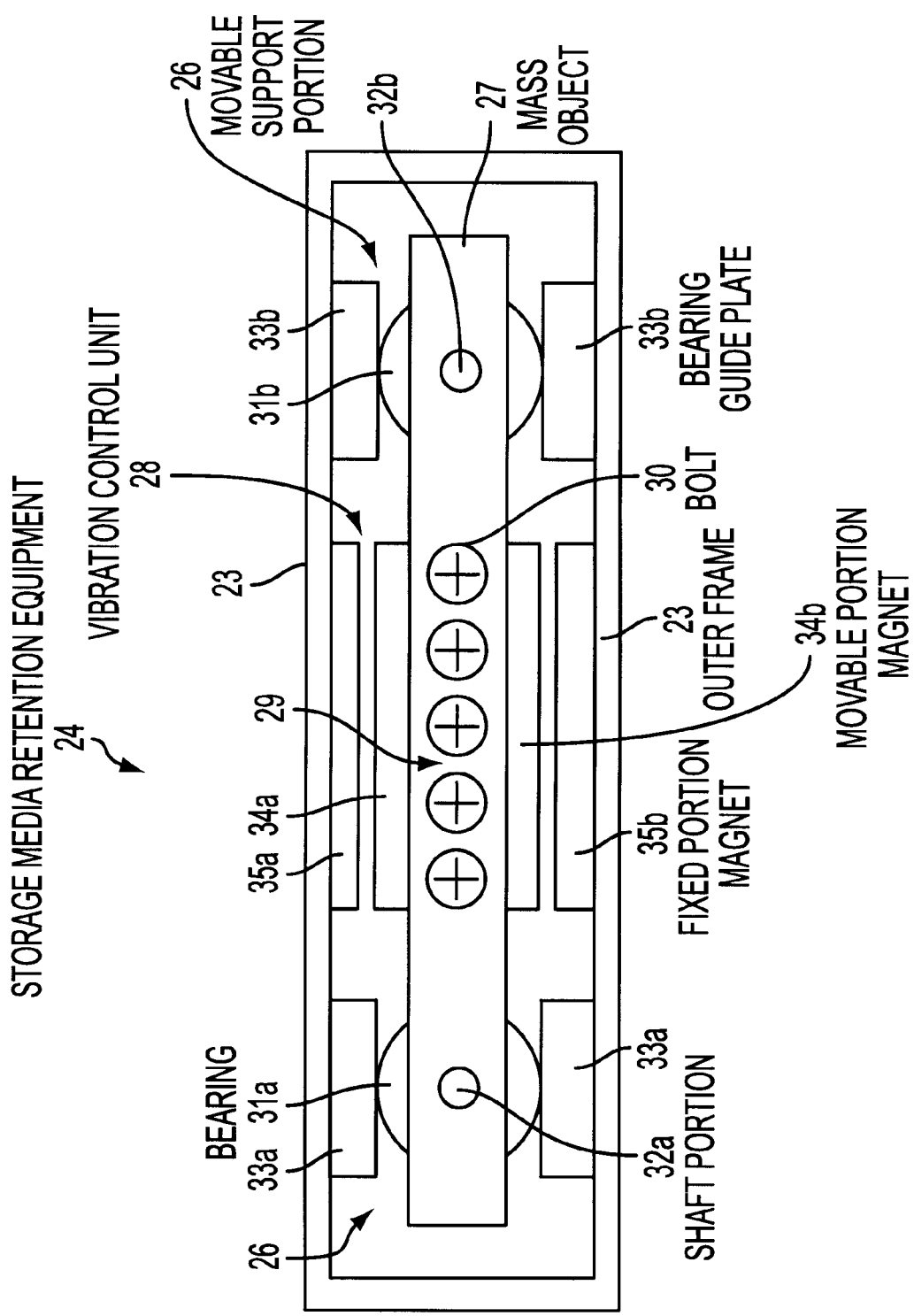
FIG. 2 is a sectional side elevation showing of a storage media retention equipment of the first embodiment according to the invention.

FIG. 2 is a sectional view showing a structure of the storage media retention equipment 24 contained in the outer frame 23. As shown in FIG. 2, the storage media retention equipment 24 includes a movable support portion 26, a mass object 27 and a vibration control unit 28.

The movable supporting portion 26 is movable and is provided in the outer frame 23. The movable supporting portion 26 includes bearings (31a, 31b), shaft portions (32a, 32b) and plane bearing guide plates (33a, 33b). A vibration control unit 28 is provided between the mass object 27 and the outer frame 23. The vibration control unit 28 includes movable portion magnets (34a, 34b) and fixed portion magnets (35a, 35b).

The vibration control unit 28 transfers the inertia force from the fixed frame 21 of the storage device 20 to the mass object 27 through the outer frame 23, and as a result, decreases a vibration energy or inertia force in the fixed frame 21 of the storage device 20.

The mass object 27 is shown having five bolts 30 as an adjust weight portion 29 in the central part. Of course, other numbers of the bolts are possible for use with the mass object 27. The bearings (31a, 31b), as part of the movable supporting portion 26, are attached at both ends of the mass object 27 through the shaft portions (32a, 32b), respectively. In addition, the bearings (31a, 31b) are detachable.

The plane bearing guide plates (33a, 33b) are respectively fixed to an inner vertical side of the outer frame 23 to guide the bearings (31a, 31b). The height of the bearing guide plates (33a, 33b) is adjustable. The movable portion magnets (34a, 34b), as part of the vibration control unit 28, are fixed to both sides of the mass object 27.

The position of the fixed portion magnets (35a, 35b) is the position which faces the movable portion magnets (34a, 34b). The fixed portion magnets (35a, 35b), as part of the vibration control unit 28, are fixed to the inner sides of the outer frame 23.

FIG. 3(a) is a side view of a permanent magnet with a plurality of poles applied as a movable portion magnet and a fixed portion magnet. FIG. 3(b) is a top view of the permanent magnet. As shown in FIG. 3(a) and FIG. 3(b), the permanent magnet with a plurality of magnetic poles 36 has a rectangular shape with a back yoke 37.

The rectangular shape is provided for both the movable portion magnets (34a, 34b) and fixed portion magnets (35a, 35b). The back yoke 37 includes a magnetic material. The magnet material 38 is fixed on the upper part of the back yoke 37. The magnet material 38 is magnetized at two or more places simultaneously by the use of magnetizing equipment (not shown), and consequently, becomes the permanent magnet with a plurality of magnetic poles.

On the surface of the magnet material 38, an S pole 40 and an N pole 41 are disposed in such a manner that adjacent magnets (40, 41) have different poles, with a magnetically neutral area 39 providing a predetermined interval between the adjacent magnetic poles.

In addition, each S pole 40 and each N pole 41 has a rectangle form with a long side being disposed in a widthwise direction of the magnet material 38. Using the permanent magnet with a plurality of magnetic poles, the movable portion magnets (34a, 34b) are mounted on both sides or upper and lower side of the mass object 27, and the fixed portion magnet (35a, 35b) are mounted on the inner sides of the outer frame 23.

FIG. 4(a) is a side view showing the stationary state of a movable portion magnet and a fixed portion magnet.

FIG. 4(b) is a side view showing the state where a movable portion magnet is shifted from the stationary state position with a relative displacement to a fixed portion magnet. As shown in FIG. 4(a), the movable portion magnet 34 and the fixed portion magnets (35a, 35b) are arranged so that each magnet material 38 of the movable portion magnets (34a, 34b) and the fixed portion magnets (35a, 35b) will be at position directly opposite to each other.

In the stationary state of the storage device 20, that is, when the storage device 20 is not vibrated, magnetic poles of the movable portion magnets (34a, 34b) are disposed such that their adjacent magnetic poles are respectively different, and their magnetic poles are different from magnetic poles of the fixed portion magnets (35a, 35b) that are positioned directly opposite to them.

The movable portion magnets (34a, 34b) are shifted (or dislocated) in the direction of arrow X from the stationary position in FIG. 4(a) according to the vibration caused by the storage media rotation. The vibration energy or inertia force is generated by the attraction force:F1 and the repulsion force:F2 acting between the movable portion magnets and the fixed portion magnets facing each other.

In the storage device 20 in this embodiment, if a storage media, such as a magnetic disk (not shown) in the fixed frame 21 of the storage device 20, rotates with a constant rotational speed, vibration will occur in the fixed frame 21 of the storage device 20 due to a rotational unbalanced mass. The vibration is transmitted to the outer frame 23 of the storage media retention equipment 24 fixed to the exterior of the fixed frame 21 of the storage device 20, and causes vibration of the outer frame 23.

At this time, the mass object 27 contained in the outer frame 23 is guided by the plane bearing guide plate (33a, 33b) fixed to the bearings (31a, 31b) and the outer frame 23 which are disposed at the both ends. Also, the mass object 27 is connected with the outer frame 23 by the fixed portion magnets (35a, 35b) and the movable portion magnets (34a, 34b), and the mass object 27 vibrates in one direction.

The vibration of the storage device 20 can be reduced by the transmission of inertia force, that is, vibration energy or inertia force between the storage device 20 and the mass object 27 according to the resonance of the mass object 27. This inertia force is transmitted through the vibration control unit 28 composed of the movable portion magnets (34a, 34b) and the fixed portion magnets (35a, 35b).

When the storage device 20 is operated under a steady-state with a constant rotational speed, the vibration of the storage device 20 is excited by the rotation of the storage media 3. So, the frequency of vibration is equal to the rotational speed. On the other hand, a weight of the mass object 27 and a spring constant of the vibration control unit 28 form the vibration system.

Therefore, when the natural frequency of this vibration system is tuned to the rotational speed, the inertia force can be efficiently transferred from the storage device 20 to the mass object 27 according to the resonance of this vibration system. Adjustment is finely tuned by the attachment and removal of bolts 30 which are provided at the mass object 27, as shown in FIG. 2.

By this fine tuning, the vibration of the mass object 27 serves as a resonance point when the storage device 20 is operated under a steady-state. Therefore, the vibration of the fixed frame 21 of the storage device 20 can be reduced by the vibration. For this reason, the vibration of the fixed frame 21 of the storage device 20 can be reduced by the vibration reduction of the mass object 27.

For example, when this embodiment is applied to a storage device, such as a magnetic disk used for electronic equipment for a computer for continuous-running plant control, the vibration of the storage device can be easily controlled without the need for fixing the storage device to a cabinet by the use of screws or rubber isolators.

Therefore, a high revolution type storage device which allows for easy removal of the storage device can be obtained. Moreover, while the storage capacity, read-out speed and write-in speed of the storage device 20 can be improved, the storage device 20 with a high reliability due to vibration control can be obtained. Moreover, a large force is not acting on the bearings (31a, 31b) and the plane bearing guide plates (33a, 33b) as a result of the magnetic attraction on both sides of the mass object 27.

Therefore, while the friction resistance can be made smaller on the movement of the mass object 27, the life-time of the bearings (31a, 31b) and the plane bearing guide plates (33a, 33b) can be improved. Moreover, in this embodiment, facing (or confronting) magnetic pole of the movable portion magnets (34a, 34b) and the fixed portion magnets (35a, 35b) has a different adjacent magnetic pole.

Moreover, in the stationary position of the mass object 27, each magnetic pole of the movable portion magnets (34a, 34b) which is disposed so that their position is provided in opposite relation to each magnetic pole of the fixed portion magnets (35a, 35b), and each magnetic pole of the movable portion magnets (34a, 34b) and the fixed portion magnets (35a, 35b) faces a different magnetic pole with respect to each other. Furthermore, a plurality of long rectangular magnetic poles are provided.

Therefore, as the attraction force:F1 and the repulsion force:F2 between facing (or confronting) magnetic pole shown in FIG. 4(b) can be used efficiently, a large magnetic restoring force can be obtained by using a small-sized magnet. Also, the storage media retention equipment 24 can be miniaturized.

According to this embodiment, the demand space for installation is reduced as compared with a coiled spring, for example, that is provided as a vibration control unit to transmit the vibration energy or inertia force. Also, by using a magnet, miniaturization of the storage device can be attained. Moreover, according to this embodiment, since there is no mechanical contact section to the mass object like a coiled spring, vibration of the fixed frame of the storage device can be reduced more effectively and stably.

Moreover, according to this embodiment, the manufacturing efficiency of the fixed magnet portion and the movable magnet portion is improved as compared with the magnet manufacture method which fixes two or more rectangular magnets to a back yoke which contains magnetic material and which connects separate magnets to each other, for example. Moreover, the vibration energy or inertia force by using larger magnetism is obtained from the magnet material between the adjoining magnetic poles being magnetized to some extent.

For this reason, since the same magnetic spring constant can be obtained when a magnet form is miniaturized comparatively, miniaturization of the whole storage device can be performed. Further, making the length of the short side of a rectangular-shaped magnet material with a long side length according to this invention, the attraction force and the repulsion force between magnetic poles when the mass object transfers in the direction of the long side of the rectangular-shaped magnet material can be used efficiently. Also, a large restoring force can be obtained as well.

Moreover, it is possible to miniaturize the whole magnet by strengthening the magnetic flux of the whole magnet, using the magnetic poles adjoined in a magnet material, and the magnetic pole of the fixed magnet portion and the movable magnet portion which face each other at a different magnetic pole. Furthermore, by using a weight for adjustment, for example, by using a bolt or bolts, and removing or attaching from the mass object, to the revolution of the storage medium, a fine tuning of the natural frequency of the mass object and a vibration control unit can be attained, and thus optimization of the vibration reduction effect of storage can be attained. Moreover, height adjustment of the bearing section can be attained and the stabilization of the mass object at the operation can be attained.

Furthermore, attachment and removal of the storage media retention equipment 24 of the outer frame 23 is possible to the fixed frame 21 of the storage device 20. Therefore, when performing a high performance upgrade of a conventional storage device of an electrical equipment, a large-scale vibration control accompanied by a high revolution becomes unnecessary.

Figure 5:
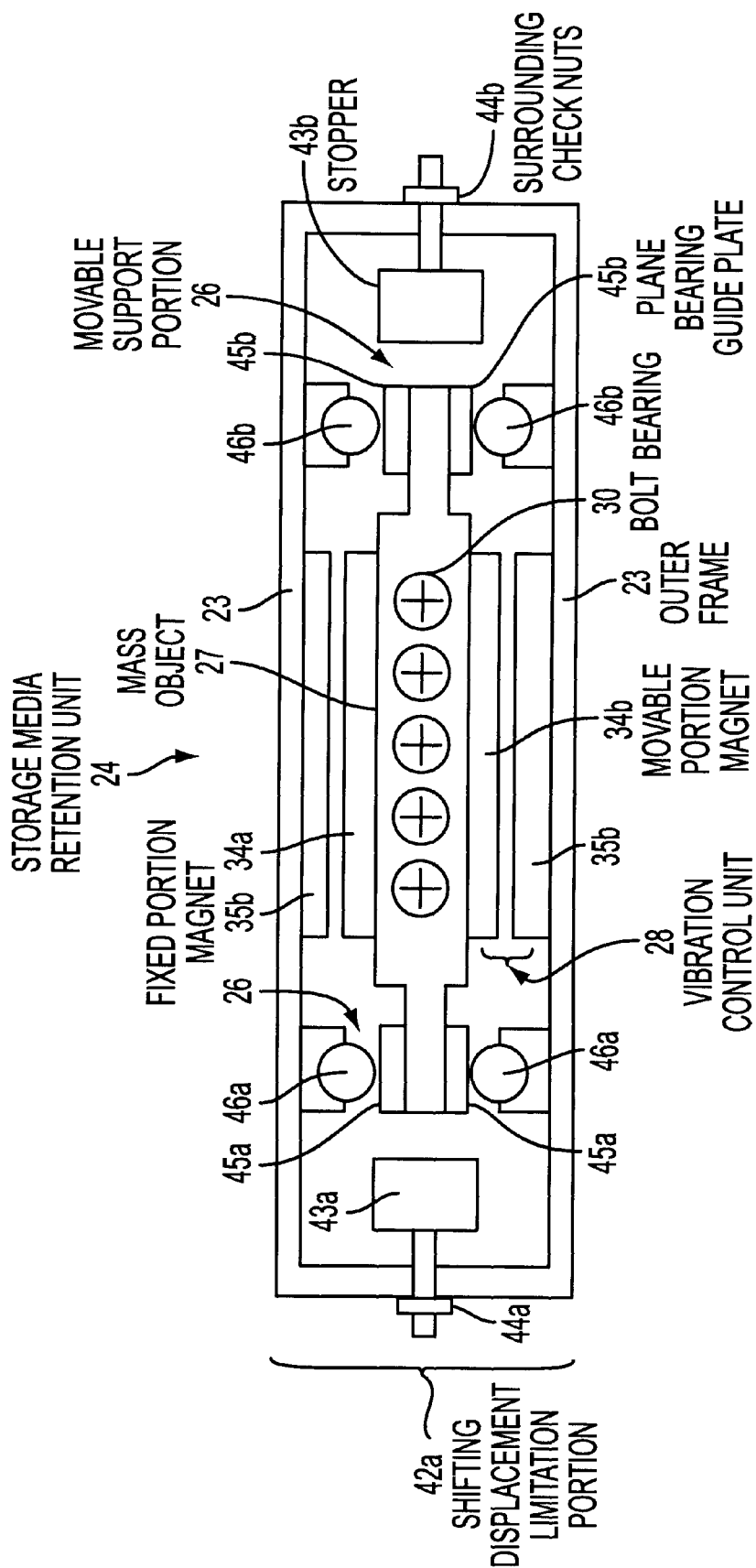
FIG. 5 is a side view showing a storage media retention equipment equipped with a transfer displacement limitation portion of a second embodiment according to this invention.

In a second embodiment, a storage media retention equipment having a shifting displacement limitation portion which limits a movable portion range of amass object is explained, referring to FIG. 5.

FIG. 5 is a sectional view showing a structure of the storage media retention equipment 24 equipped with a shifting displacement limitation portion. In addition, since the main structure of the storage media retention equipment 24 is almost the same as that of FIG. 2, so the same label for the same parts is used and a detailed explanation of these parts is omitted. Here, what is different from the first embodiment is mainly explained.

As shown in FIG. 5, the storage media retention equipment 24 includes an outer frame 23, a movable support portion 26, a mass object 27 and a vibration control unit 28. The movable supporting portion 26 is movable are provided in the outer frame 23. The movable supporting portion 26 includes shifting displacement limitation portions (42a, 42b), bearings (46a, 46b) and plane bearing guide plates (45a, 45b).

A vibration control unit 28 is provided between the mass object 27 and the outer frame 23, and it includes movable portion magnets (34a, 34b) and fixed portion magnets (35a, 35b). The mass object 27 is mounted in an outer frame 23 through the movable supporting portion 26, and is movable in a lateral (left-right in FIG. 5) direction. Between the mass object 27 and the outer frame 23, a vibration control unit 28 is provided.

The vibration control unit 28 decreases a vibration energy or inertia force in a fixed frame 21 of the storage device 20 (not shown), and it makes a vibration energy or inertia force of the outer frame 23 decrease, by transferring the vibration energy or inertia force to the mass object 27. The shifting displacement limitation portions (42a, 42b), which limits the maximum displacement of the mass object 27 are provided inside of the outer frame 23, and are disposed opposite respective ends of the mass object 27, in the vibration direction of the mass object 27.

The shifting displacement limitation portions (42a, 42b) include stoppers with screw portions (43a, 43b), and surrounding check nuts (44a, 44b) that affix the stoppers (43a, 43b) to the outer frame. The stoppers with the screw portions (43a, 43b) are inserted into the outer frame 23, and the screw portions are positioned by the surroundings check nuts (44a, 44b). The stoppers (43a, 43b) is affixed inside of the outer frame 23.

Plane bearing guide plates (45a, 45b) are provided at the vertical side of both ends of the mass object 27, respectively. Bearings (46a, 46b) are respectively provided at the inner vertical side of the outer frame 23, corresponding to the plane bearing guide plates (45a, 45b). In addition, the bearings (46a, 46b) are detachable, and a height of the plane bearing guide plates (45a, 45b) can be adjusted.

Moreover, the movable portion magnets (34a, 34b), as a part of a vibration control unit 28, are fixed to the vertical side of the mass object 27. Also, the fixed portion magnets (35a, 35b), as a part of vibration control unit 28, are respectively fixed to the inner vertical sides of the outer frame 23 arranged opposite to the movable portion magnets (34a, 34b).

According to this embodiment, the storage media retention equipment 24 operates like the first embodiment, and the vibration of the fixed frame 23 in the storage device 20 is thereby reduced. Therefore, for a storage device 20 which has a high rotational speed, a high reliability can be obtained and an easy exchange of the storage device 20 can be made. Moreover, even if the rotational speed of the storage device 20 should shift out of a predetermined frequency of the vibration of the mass object 27 and the amplitude of the mass object 27 should increase, the respective ends of the mass object 27 will bump against the stoppers (43a, 43b), and the displacement of the mass object 27 will be limited to a predetermined range as a result.

According to this embodiment, since a demand space for installation is reduced as compared with a coiled spring, for example, by the use of a vibration control unit to give vibration energy or inertia force, and by the use of a magnet, miniaturization of the storage device can be attained. Moreover, according to this embodiment, since there is no mechanical contact section to the mass object like a coiled spring, the vibration prevention can be performed with magnetism at the small vibration of the mass object, and the vibration of the fixed frame of the storage device can be reduced more effectively and stably.

Moreover, according to this embodiment, the manufacturing efficiency of the fixed magnet portion and the movable magnet portion improves as compared with a magnet manufacturing method which fixes two or more rectangular magnets to a back yoke contains magnetic material and which connects separate magnets to each other, for example. Moreover, the vibration energy or inertia force by use of larger magnetism is obtained from the magnet material between the adjoining magnetic poles being magnetized to some extent.

For this reason, since the same magnetic spring constant can be obtained with a magnet that is miniaturized comparatively, miniaturization of the whole storage device can be performed. Further, by having a rectangular-shaped magnet material according to the invention, the attraction force and the repulsion force between magnetic poles when the mass object moves in the direction of a long side of the rectangular-shaped magnet materials can be used efficiently. Also, a large restoring force can be obtained.

Moreover, it is possible to miniaturize the whole magnet by strengthening the magnetic flux of the whole magnet, using the magnetic pole adjoined in a rectangular-shaped magnet material, and the magnetic poles of the fixed magnet portion and the movable magnet portion face each other of a different magnetic pole. Moreover, height adjustment of the bearing section is attained and stabilization of the mass object can be attained.

For this reason, the increase in vibration of the fixed frame 21 of the storage device 20 due to amplitude increase of the mass object 27 can be prevented. Thus, the storage device with higher reliability can be obtained.

In the first embodiment and the second embodiment, although the cabinet where one storage media retention equipment 24 is mounted in the storage device 20 is described, this invention is not restricted to the above-mentioned structure. That is, two or more storage media retention equipment 24 in the storage device 20 can be provided.

Figure 6:
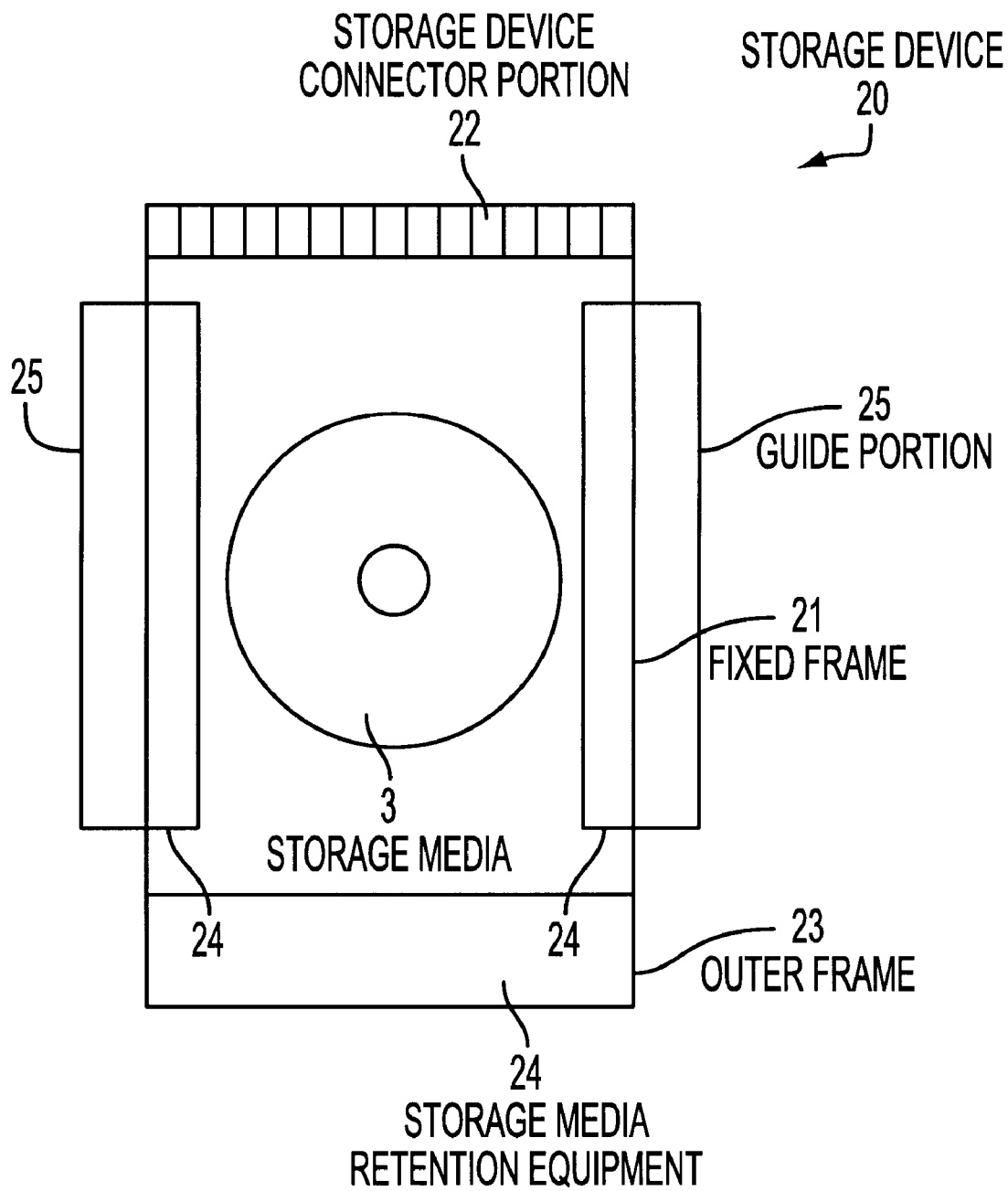
FIG. 6 is a top view showing a storage device that includes a plurality of storage media retention equipment.
Figure 7:
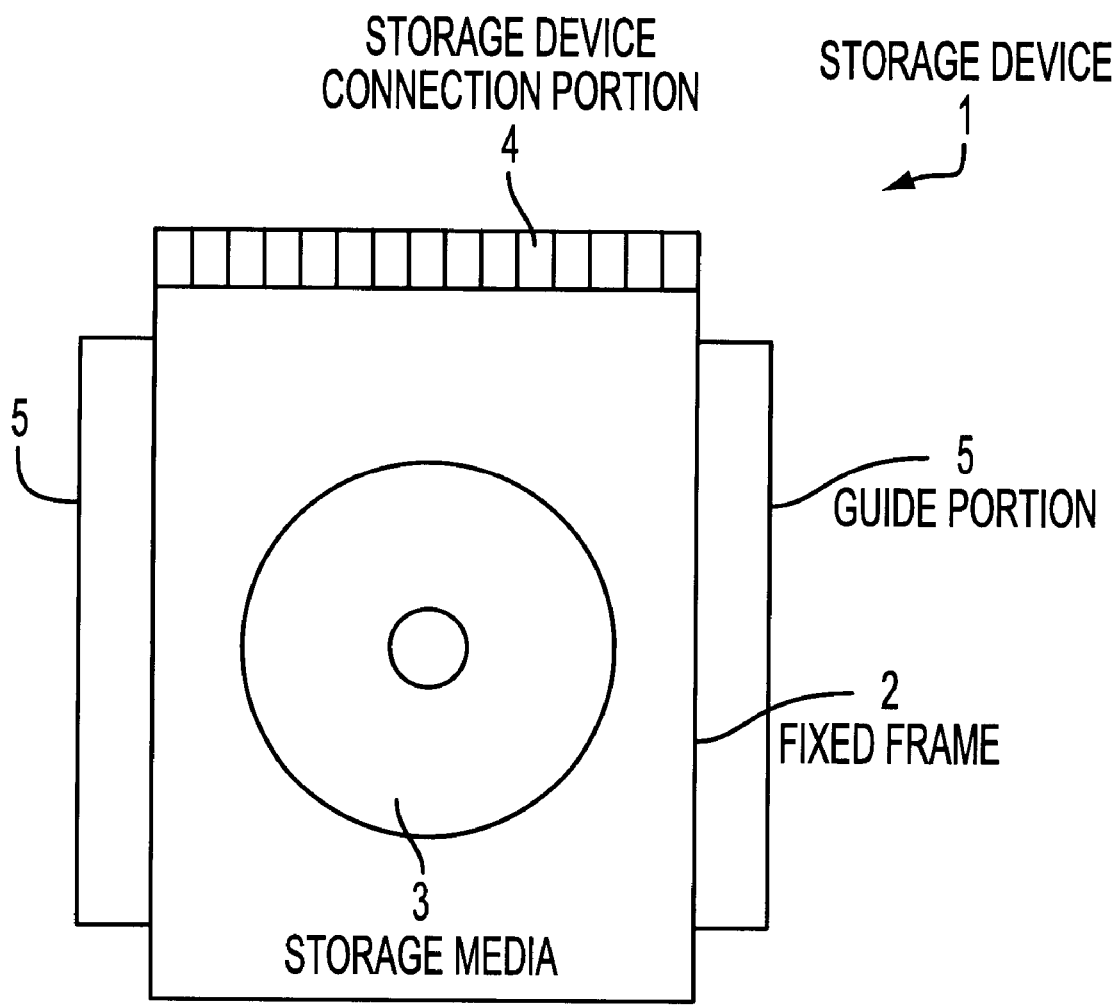
FIG. 7 is a top view of a conventional art.
Figure 8:
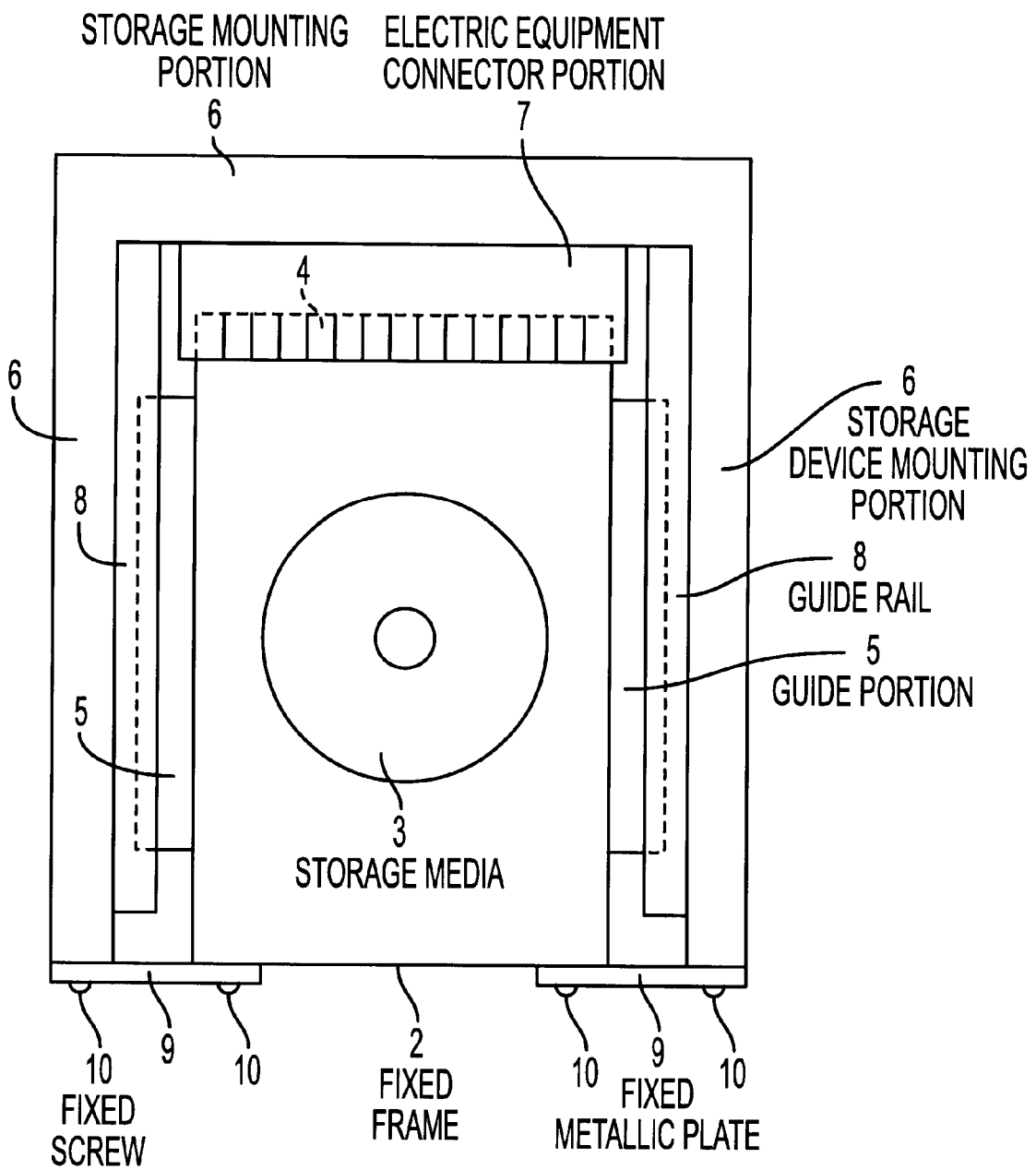
FIG. 8 is a top view showing an attachment state to an electric equipment of a storage device of a conventional art.
Figure 9:
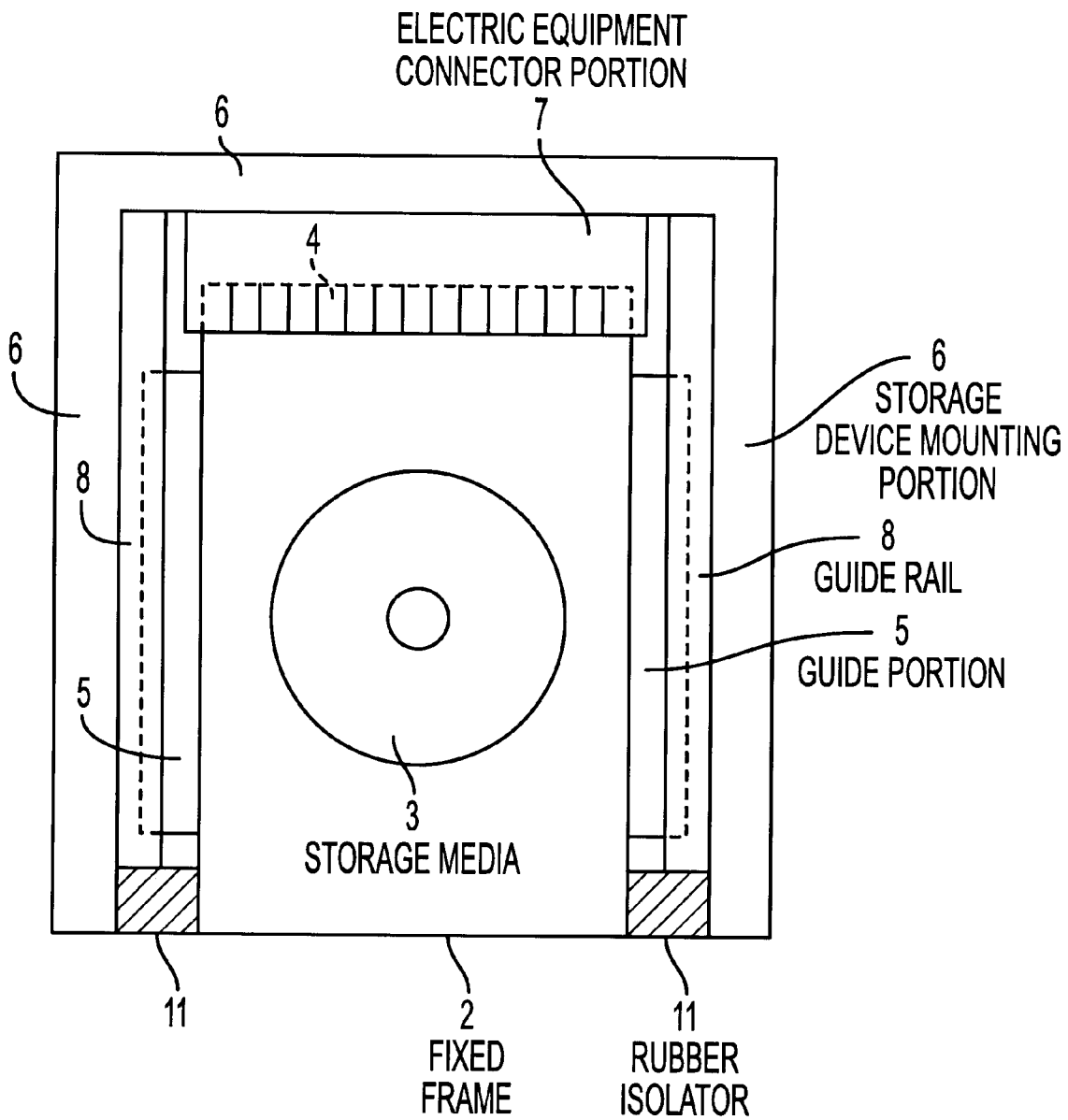
FIG. 9 is a top view showing an attachment state to an electric equipment of a storage device of a conventional art.

FIG. 6 is a top view showing the structure of a third embodiment of a storage device in which is installed two or more storage media retention equipment in a fixed frame of the storage device. As shown in FIG. 6, a storage device connector portion 22 for making electric connection is formed on one side of a fixed frame 21 of the storage device 20.

The storage media retention equipment 24 is provided on three sides other than the side in which the storage device connector portion 22 is connected.

According to this embodiment, each storage media retention equipment 24 operates like the first embodiment and the second embodiment, and can reduce the vibration of the fixed frame 21 of the storage device 20. Moreover, even if the vibration which is not in only one specific direction occurs in the fixed frame 21 of the storage device 20, vibration may be reduced by each storage media retention equipment 24 sharing a direction in which the vibration occurs, respectively.

Therefore, a storage device with high rotational speed and with high reliability can be obtained. Furthermore, it is possible to absorb the vibration of any direction along a surface of the storage device 20. Therefore, a vibration reduction effect can be obtained. In addition, this storage device is not limited to the structure mentioned above.

That is, the storage device mentioned above is applicable to a storage device having a storage media like a magnetic optical disk storage and a optical disk storage device which are easy to replace, and having a storage media like a magnetic disk storage device which is difficult to replace.

Moreover, when the storage device mentioned above is applicable to a storage device attachment cabinet, such as electric equipment, or an exclusive cabinet for the storage device, reliability in read-out and write-in can be achieved. Moreover, not only reduction of the horizontal vibration, but also reduction of the vertical vibration of the storage device can be achieved. Furthermore, an adjustment of a natural frequency of the mass object 27 may be used to regulate the method of regulating the gap between the fixed portion magnet and the movable portion magnet, in a method other than the method of attachment and removal of an adjustment weight as described earlier.

As above mentioned, each embodiment according to this invention can reduce the vibration accompanied by rotation of the storage media, without harming the exchange workability of the storage device. Therefore, a storage device with the high reliability and proper operation even when subjected to vibration can be obtained, and the storage capacity of the storage device can be increased. Also, read-out speed and write-in speed can be improved, even if the storage media is operated with a high rotational speed.

Japanese priority Application No. PH10-266657, filed on Sep. 21, 1998, including the specification, drawings, claims and abstract, is hereby incorporated by reference.

What is claimed is:

1. A storage device comprising:

a connector unit for transferring information between a storage media mounted in the storage device and an electric equipment which is operated based on said information;

a frame for holding said storage media;

a mass object adapted to be relatively movable to said frame on a plane which intersects perpendicularly with a rotating spindle of said storage media; and a vibration control unit adapted to absorb said vibration energy or said inertia force occurring in said frame when said storage media is operated by said vibration energy or said inertia force given between said mass object and said frame, wherein said vibration control unit comprises:

a movable portion magnet unit coupled to said mass object;

a fixed portion magnet unit provided opposite to said movable portion magnet unit across a gap;

wherein said mass object is horizontally positioned by way of an attraction and repulsion force which acts between said movable portion magnet unit and said fixed portion magnet unit, wherein said movable portion magnet unit comprises:

a plurality of first magnetically-polarized regions that are respectively bordered by a plurality of first magnetically-neutral regions, so as to form a first rectangular structure, adjacently-positioned ones of said plurality of first magnetically-polarized regions being of opposite magnetic polarity with respect to each other, and wherein the fixed portion magnet unit comprises:

a plurality of second magnetically-polarized regions that are respectively bordered by a plurality of second magnetically-neutral regions, so as to form a second rectangular structure, adjacently-positioned ones of said plurality of second magnetically-polarized regions being of opposite magnetic polarity with respect to each other;

a plurality of bolt holes respectively disposed in a central location on the mass object; and a plurality of bolts that are capable of being respectively threaded into the plurality of bolt holes on the mass object, wherein each of said first magnetically-polarized regions of said movable portion magnet unit has a different polarity with respect to an oppositely-positioned one of said second magnetically-polarized regions of said fixed portion magnet unit, wherein said fixed portion magnet unit is fixed on an inner surface of said frame, and wherein a weight of the mass object is capable of being changed by addition or removal of one or more of the bolts from the mass object, so as to tune the storage media retention unit to a natural frequency of the storage media when the storage media is operated and thereby revolving at a predetermined rate.

* * * * *